United States Patent
Selig et al.

(10) Patent No.: US 6,492,978 B1
(45) Date of Patent: Dec. 10, 2002

(54) KEYSCREEN

(75) Inventors: David G. Selig, Lawrenceville, GA (US); Donald L. Forsythe, Dacula, GA (US); Dale R. Lyons, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/087,816

(22) Filed: May 29, 1998

(51) Int. Cl.⁷ .................................................. G09G 5/00
(52) U.S. Cl. ........................................ 345/173; 345/168
(58) Field of Search ................................ 345/156, 168, 345/173, 174, 1, 169, 184; 178/18.01, 18.03, 18.05, 18.06, 18.07

(56) References Cited

U.S. PATENT DOCUMENTS

| | | | |
|---|---|---|---|
| 3,778,553 A | 12/1973 | Rackman | 179/2 |
| 4,002,855 A | 1/1977 | Schiffman et al. | 179/90 |
| 4,326,193 A | 4/1982 | Markley et al. | 340/365 |
| 4,491,692 A | 1/1985 | Lee | 179/90 |
| 4,639,881 A | 1/1987 | Zingher | 364/521 |
| 4,870,458 A | 9/1989 | Shibuya et al. | 355/200 |
| 4,882,582 A | 11/1989 | Oka | 341/23 |
| 4,890,832 A | 1/1990 | Komaki | 273/1 |
| 4,899,137 A | 2/1990 | Behrens et al. | 340/711 |
| 5,057,677 A * | 10/1991 | Bertagna et al. | 235/380 |
| 5,140,632 A | 8/1992 | Anten | 379/447 |
| 5,214,429 A | 5/1993 | Greenberger | 341/22 |
| 5,223,677 A | 6/1993 | Kapp et al. | 778/18 |
| 5,416,610 A | 5/1995 | Kikinis | 358/474 |
| D359,273 S | 6/1995 | Dittmer | D14/105 |
| 5,485,176 A | 1/1996 | Ohara et al. | 345/173 |
| 5,572,573 A | 11/1996 | Sylvan et al. | 379/61 |
| 5,574,446 A * | 11/1996 | Dittrich et al. | 341/22 |
| 5,576,981 A | 11/1996 | Parker et al. | 364/709.1 |
| 5,577,848 A | 11/1996 | Bowen | 400/472 |
| 5,581,243 A * | 12/1996 | Ouellette et al. | 345/173 |
| 5,581,670 A | 12/1996 | Bier et al. | 395/326 |
| 5,584,054 A * | 12/1996 | Tyneski et al. | 455/89 |
| 5,594,471 A * | 1/1997 | Deeran et al. | 345/173 |
| 5,601,489 A | 2/1997 | Komaki | 463/44 |
| 5,657,072 A | 8/1997 | Aristides et al. | 348/13 |
| 5,694,150 A * | 12/1997 | Sigona et al. | 345/145 |
| 5,701,141 A | 12/1997 | Schmenk et al. | 345/157 |
| 5,715,524 A * | 2/1998 | Jambhekar et al. | 455/128 |
| 5,738,450 A * | 4/1998 | Lukosch | 400/495 |
| 5,808,920 A * | 9/1998 | Zwan et al. | 364/579 |
| 5,847,698 A * | 12/1998 | Reavey et al. | 345/173 |
| 5,887,995 A * | 3/1999 | Holehan | 400/479.1 |
| 5,982,355 A * | 11/1999 | Jaeger et al. | 346/161 |
| 6,088,023 A * | 6/2000 | Louis et al. | 345/173 |
| 6,175,679 B1 * | 1/2001 | Veligdan et al. | 385/120 |
| 6,286,064 B1 * | 9/2001 | King et al. | 710/67 |

OTHER PUBLICATIONS

Arc–USA, "Stanford Keypad GL–101," 1996, two pages.
Microtouch, "Capacitive and Resistive Touchscreens," 1996, seven pages.
NCR, "NCR 5962 Touch Screen," 1997, 2–pages.
NCR, "NCR DynaKey Advanced Retail Interface," 1997, 2–pages.
NCR, "NCR 5944 Electronic Payment Terminal," 1992, 2–pages.

* cited by examiner

*Primary Examiner*—Vijay Shankar
*Assistant Examiner*—Mansour M. Said
(74) *Attorney, Agent, or Firm*—Francis L. Conte

(57) ABSTRACT

A KeyScreen includes a touchscreen for providing an output position signal indicative of location thereon, with a keypad disposed over the touchscreen. The keypad has a plurality of articulated keys to operably engage the touchscreen upon depression thereof and thereby provide tactile feedback to the user.

22 Claims, 7 Drawing Sheets

KEYSCREEN

BACKGROUND OF THE INVENTION

The present invention relates generally to data entry keyboards, and, more specifically, to touchscreens.

The digitally programmable computer has become ubiquitous in every day life. It is found in various forms from simple to complex for performing various functions. In common applications, the computer is joined to a display monitor for presenting useful information to the intended user, and allows the user to interact with the computer through a communicating keyboard. Data may be entered into the computer by touching keys on the keyboard and viewed on the monitor. The specific software loaded into the computer controls the specific functionality of the computer for any desired purpose.

For example, common computer systems are found in retail stores, supermarkets, and automated teller machines (ATMs) for use by customers or employees as applicable.

A typical mechanical keyboard, or keypad, includes a plurality of individual keys or buttons which are individually depressed by the user for entering corresponding data into the computer. The keys are typically preprinted with a specific indicia such as a letter or number for fixed-function use. Some keys, however, may have different functions depending upon the assignment thereof which may be varied by the specific software programmed in the computer. Such keyboards are relatively easy to use and provide tactile feedback to the user since they have a three-dimension (3-D) contoured shape and typically include a mechanical switch therebelow which provides a limited snap depression of the individual key with a self-restoring movement, and with or without an audible click or speaker-generated beep.

Another type of data entry device is a touchscreen which provides a transparent interface over the display monitor. Touchscreens are found in various conventional formats including a resistive touchscreen, capacitive touchscreen, infrared (IR) touchscreen, and acoustic wave touchscreen for example. Each touchscreen design has the capability to accurately determine a two dimensional location of a finger or stylus positioned thereon in accordance with a predefined location grid or array.

For example, in both the resistive and capacitive touchscreens, a user may place a finger at any location on the screen, and an output position signal is generated by the touchscreen which corresponds to the location being touched. In the resistive touchscreen, the contact force alone effected by the finger determines the screen location. In the capacitive touchscreen, a capacitive circuit is formed between the screen and the user, who is typically grounded, for determining the location of the finger.

A particular advantage of the touchscreen is that an independent keyboard is not required for data entry. And, most significantly, is the ability to dynamically define a visual or virtual keyboard on the display monitor for data entry. The touchscreen is operatively joined to a host computer which drives the display monitor. The specific software controls the information displayed on the monitor which is used to communicate with the user. If data entry is required, the computer displays the desired indicia on the monitor which is transmitted through the transparent touchscreen disposed thereover.

For example, the computer may display a numeric keypad with the numbers 0–9 arranged in a virtual keypad with corresponding virtual key areas thereon. By touching the touchscreen at any one of the corresponding virtual keys, the touchscreen identifies the exact touch location and communicates this to the computer which matches the position signal with the location of the displayed virtual keypad for determining which virtual key has been selected.

Since it is an easy matter to program the computer to visually display any desired information and coordinate that information with the touchscreen, the touchscreen provides the ability to enter data using any defined virtual keypad displayed on the monitor which may change dynamically as often as desired.

However, since data entry into the computer through the touchscreen is simply based on the 2-D virtual keypad displayed on the monitor, the virtual keys are without depth or any feel other than the simple pressure reaction atop the flat touchscreen. The touchscreen surface is plain without surface differences, and the user must therefore carefully aim to touch the desired virtual key. Unlike a conventional remote keyboard, the touchscreen has no capability to provide tactile feedback to the user which limits its usefulness and accuracy in use.

Accordingly, it is desired to provide tactile feedback in a touchscreen for matching the benefits of a mechanical keyboard.

SUMMARY OF THE INVENTION

A KeyScreen includes a touchscreen for providing a position signal indicative of location thereon, with a keypad disposed over the touchscreen. The keypad has a plurality of articulated keys to operably engage the touchscreen upon depression thereof and thereby provide tactile feedback to the user.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
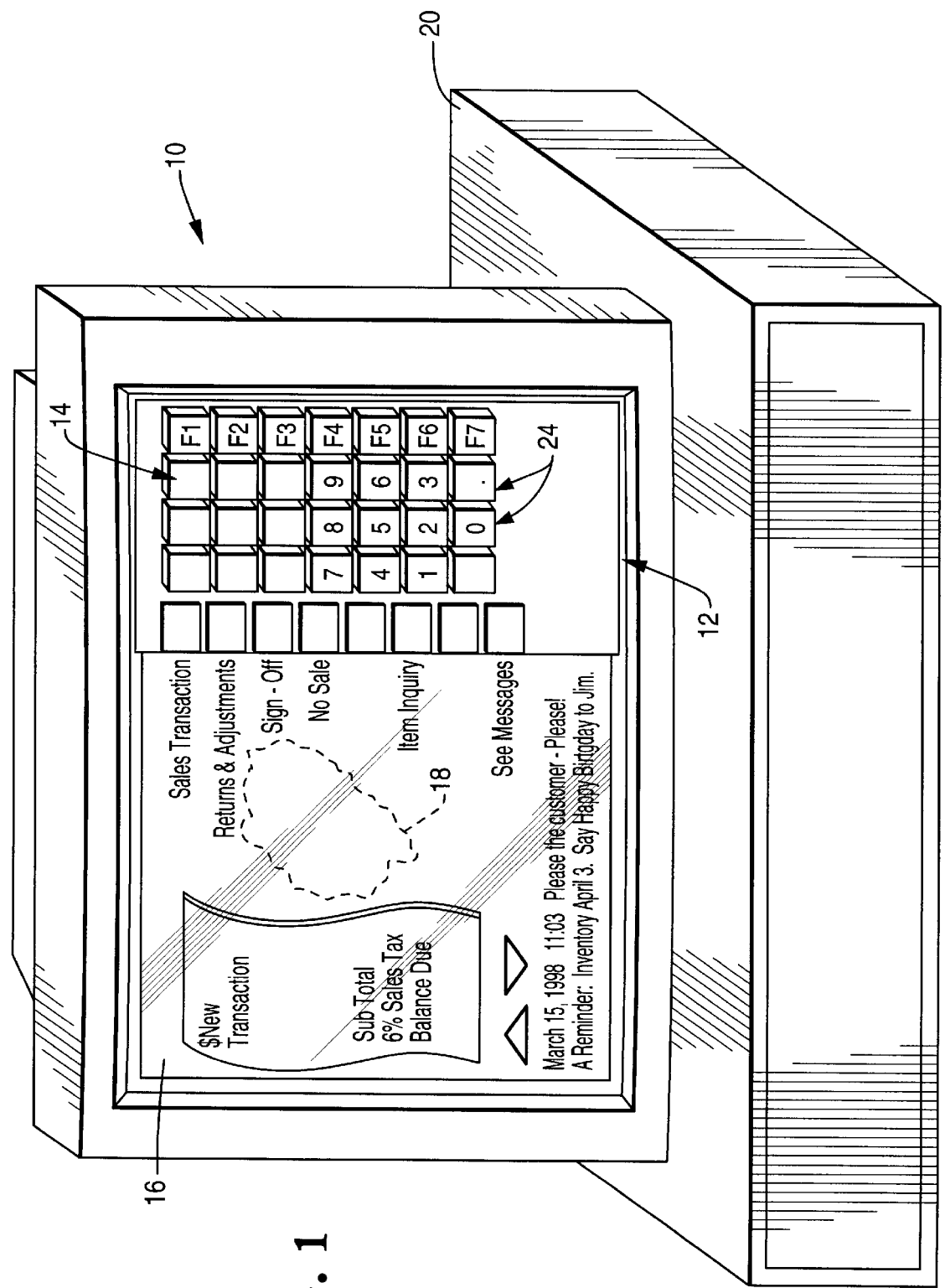
FIG. 1 is a perspective view of an exemplary computer-based terminal including a keyscreen for entering data through a display monitor thereof in accordance with an exemplary embodiment of the present invention.

Illustrated in FIG. 1 is an exemplary computer-based terminal 10 in accordance with an exemplary embodiment of the present invention. The terminal 10 is configured in this embodiment as a point of sale (POS) terminal for use in a retail store or supermarket.

The terminal 10 includes a KeyScreen 12 in accordance with an exemplary embodiment of the present invention which is an assembly of a keypad 14 and a touchscreen 16 which collectively permit data entry into the terminal 10 with tactile feedback to the user. The keyscreen 12 is disposed atop a display monitor 18 which cooperates therewith.

Figure 2:
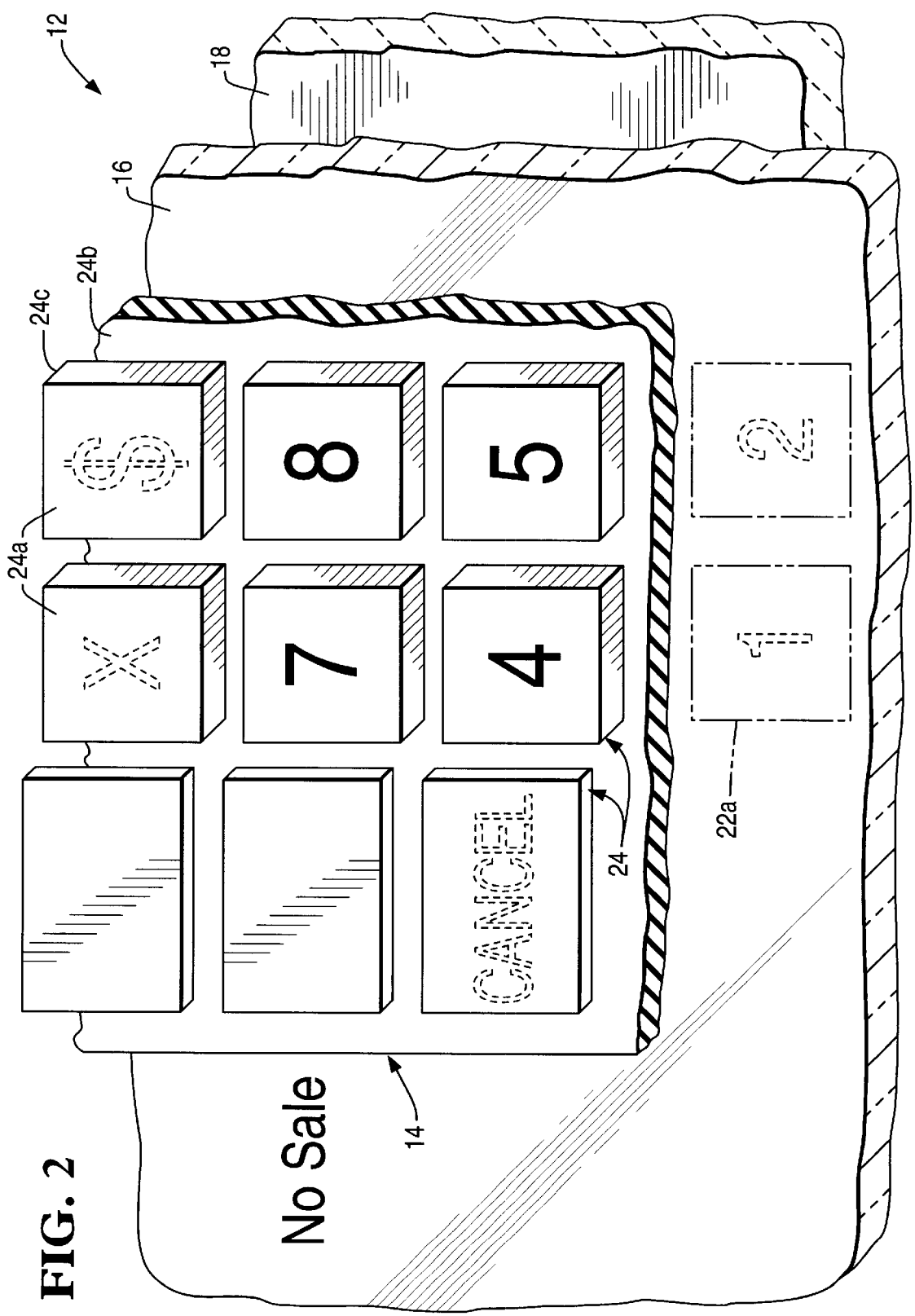
FIG. 2 is an enlarged partly sectional view of a portion of the keyscreen illustrated in FIG. 1 disposed atop a portion of the display monitor.
Figure 3:
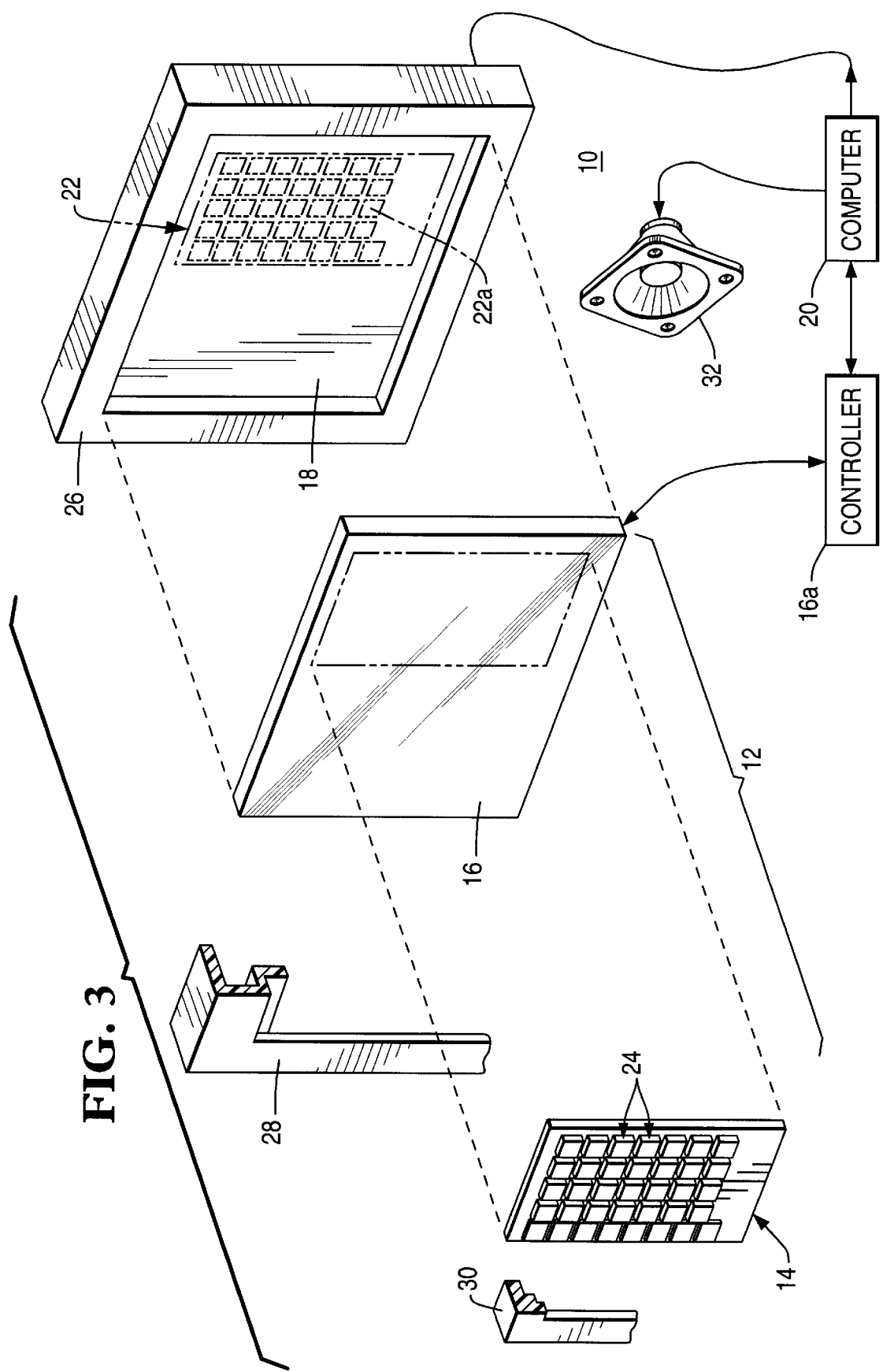
FIG. 3 is an exploded view of the terminal illustrated in FIG. 1 showing a keypad atop a touchscreen atop a display monitor in accordance with an exemplary embodiment of the present invention.

The keyscreen 12 is illustrated in more particularity in FIGS. 2 and 3. In FIG. 3, for example, the display monitor 18 may take any conventional form such as a liquid crystal display (LCD) or a cathode ray tube (CRT) operatively joined to a conventional, digitally programmable host computer 20. The computer 20 may be programmed using any suitable software which controls the intended use of the computer and the information to be displayed on the monitor 18.

For example, the computer 20 may be programmed to configure the terminal 10 as a POS terminal for listing items being purchased and producing receipts therefor in a commercial transaction. Or, the terminal 10 may be configured specifically for customer information services. Or, the terminal 10 may be configured as an automated teller machine (ATM). The terminal 10 may be configured in any desired manner for allowing interaction between a user and the device through the display monitor 18 which may take any form.

The touchscreen 16 illustrated in FIG. 3 may take any conventional form and typically is in the form of a transparent flat or curved plate which matches the profile of the display monitor 18. The touchscreen 16 includes a corresponding driver or controller 16a which operatively joins the touchscreen to the computer 20. The touchscreen 16 is configured for providing an output position signal indicative of any position or location on its two dimensional (2-D) face surface, and is actuated by touch from the finger of a user, for example. The touchscreen 16 defines a 2-D location grid or array which is encoded in its output signal sent to the computer 20 through the controller 16a.

The touchscreen 16 works in concert with the display monitor 18 in a conventional manner for any desired application. Typically, software is provided in the computer to define a virtual keypad 22 over a portion of the display monitor 18 which is visible to the user. The keypad 22 may take any suitable form with one or more virtual keys 22a having an assigned function which may be changed as desired by the software.

The virtual keypad 22 is coordinated with the cooperating touchscreen. By touching a portion of the touchscreen 16 corresponding with the position of any one of the virtual keys 22a, the touchscreen controller 16a provides the corresponding position signal to the computer indicating which of the virtual keys 22a has been accessed. In this way, data may be entered into the computer through the touchscreen 16 which overlays the monitor 18 and the virtual keypad 22 displayed thereon. The configuration of the virtual keypad 22 and its individual keys 22a may be changed as desired, and positioned at any location over the entire monitor 18 within the boundary of the touchscreen 16 for entering data into the computer 20.

However, since the touchscreen 16 provides a plain, smooth surface which is flat or slightly curved as desired to match the contour of the display monitor 18, it has no ability to provide tactile feedback to a user in the manner available with conventional mechanical keyboards having individual depressible keys. The virtual keys 22a merely exist as a visual scene without 3-D depth, and touching the screen provides no discernible distinction between different keys other than the pressure reaction from the flat screen itself.

In accordance with the present invention, a method is disclosed for providing tactile feedback to a user for data entry on the smooth touchscreen 16. By attaching the keypad 14 illustrated in FIG. 2 over any portion of the touchscreen 16, tactile feedback is provided in the assembly of the keypad 14 and touchscreen 16 which collectively define the keyscreen 12. The keypad 14 may take various forms including a plurality of articulated or flexible keys 24 which operatively engage the touchscreen upon depression thereof by the user.

The configuration of the keypad 14 including the number, size, and placement of the individual keys 24 may be selected as desired to match the corresponding virtual keypad 22 displayed on the monitor 18 as illustrated in FIG. 3. The tactile keypad 14 may then be simply positioned atop the touchscreen 16 in registry with the virtual keypad 22 for permitting data entry with the tactile keys 24 corresponding to the virtual keys 22a of the virtual keypad 22. In this way, a one to one correspondence is defined between the keys of the tactile keypad 14 and those of the virtual keypad 22.

The keypad 14 therefore provides a barrier to the touchscreen 16 preventing direct actuation thereof, with the touchscreen being actuated by firstly depressing individual ones of the keys 24 which in turn actuate the touchscreen. The keypad 14 is therefore effective for both providing tactile feedback to the user as well as in turn actuating the touchscreen 16 to correspond with the virtual keypad 22.

Figure 4:
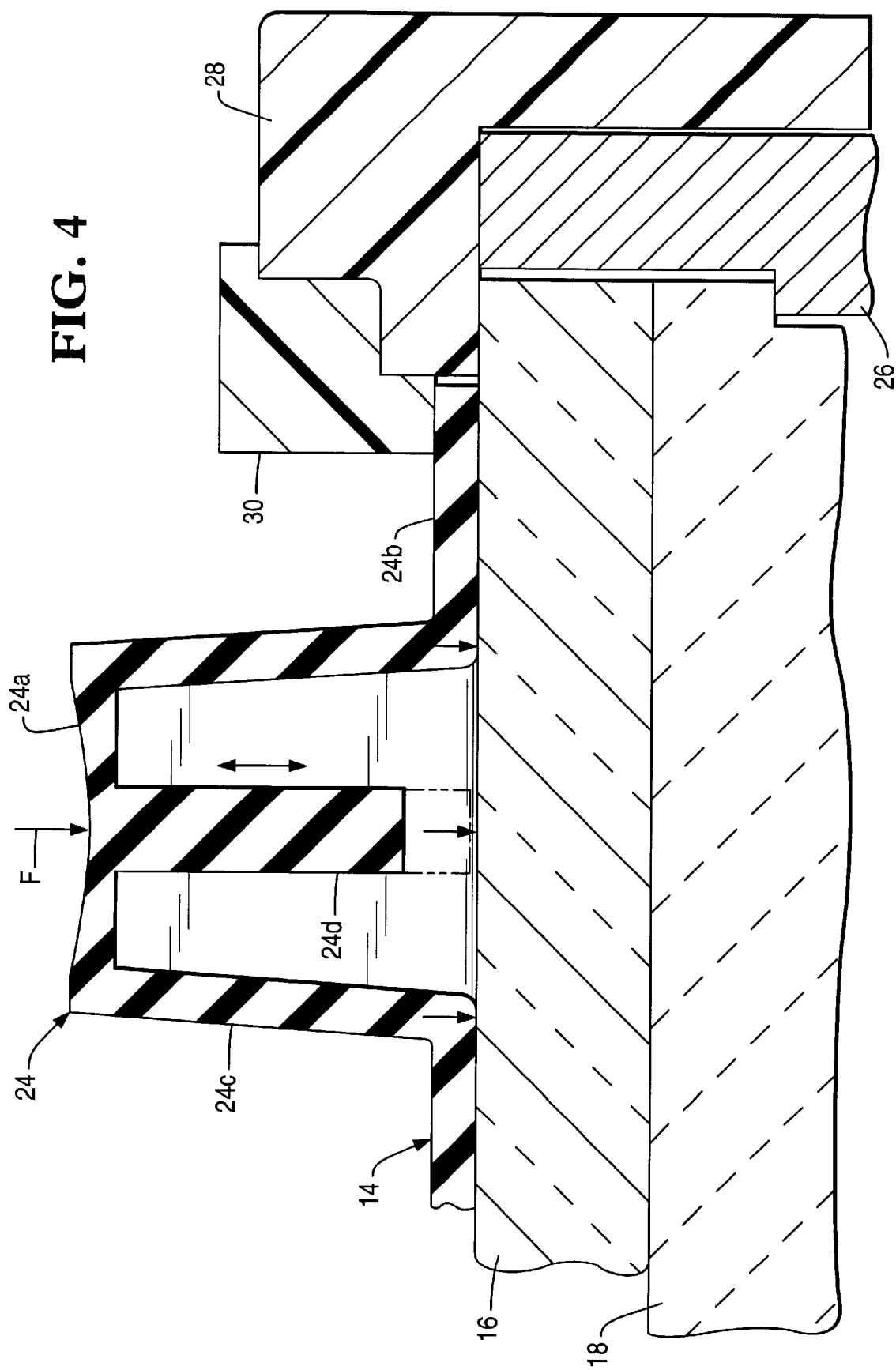
FIG. 4 is an elevational sectional view of a portion of the keypad, touchscreen, and display monitor illustrated in FIG. 1.

As shown in more detail in FIG. 4, the individual keys 24 are preferably configured for being resiliently depressed toward the touchscreen 16 for actuation thereof in any conventional manner. One manner of articulating the individual keys 24 is to form them of a suitably elastic material such as silicone rubber which allows them to be depressed downwardly with a suitable pressure force F for in turn actuating the touchscreen therebelow.

As shown in more particularity in FIGS. 2 and 4, each of the keys 24 includes a top land that defines a target 24a which is resiliently supported on a common web 24b. The target 24a is depressed by the user under suitable force F toward the touchscreen 16 for actuation thereof upon depression of the key to effect the position signal generated by the touchscreen in response thereto. By depressing an individual key 24, the touchscreen 16 produces a position signal therefor in a simple on-function. The spring support of the key 24 allows it to return to its original position without external force thereon which terminates the position signal in an off-function of the touchscreen. In this way, depressing individual keys 24 produces a corresponding position signal in the touchscreen 16 only when individual keys 24 are being depressed.

In the exemplary embodiment illustrated in FIG. 4, each of the keys 24 further includes a resilient support wall 24c having a suitable configuration to match the profile of the target 24a, with rectangular being illustrated, but circular and other forms also being possible. The support wall 24c integrally supports the target 24a atop the web 24b. The support wall 24c is disposed atop the touchscreen 16 for actuating the touchscreen upon depression of the target 24a.

In a simple embodiment, the touchscreen 16 may be a conventional resistive touchscreen being actuated solely by pressing contact by the keys 24 thereatop. Correspondingly, by pressing downwardly one of the keys 24 as illustrated in FIG. 4, the applied force is distributed around the support wall 24c and is transferred to a finite area of the touchscreen 16 in contact therewith. The touchscreen 16 has the inherent capability to average the applied force acting thereon under the key 24 and effect a position signal corresponding with the center location of the applied load. This typically corresponds with the center of the target 24a.

Figure 5:
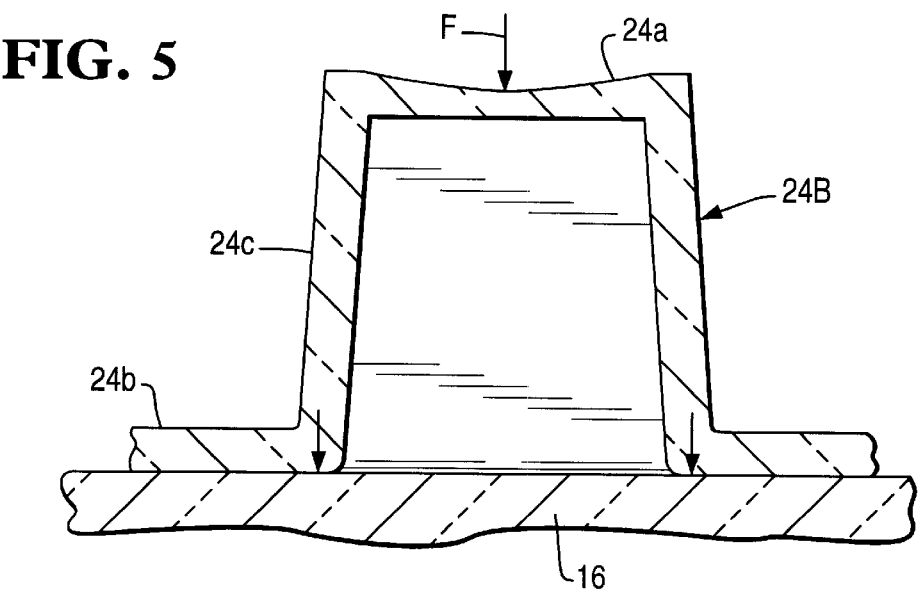
FIG. 5 is an elevational sectional view, like FIG. 4, of a keypad key in accordance with an alternate embodiment of the present invention.

FIG. 5 illustrates an alternate embodiment of one of the keys, designated 24B, which is in the form of a simple inverted cup that may actuate the touchscreen 16 by spreading the applied force around the perimeter of the support wall 24c.

In the exemplary embodiment illustrated in FIG. 4, each of the keys 24 includes a central internal stem 24d extending from the underside of the target 24a toward the touchscreen 16 for actuating the touchscreen upon depression of the target 24a. The bottom or distal end of the stem 24d is initially spaced above the surface of the touchscreen 16 for allowing predetermined travel downwardly when the target 24a is depressed. The bottom of the stem 24d then passes through a corresponding aperture in the web 24b and contacts the touchscreen 16 when the key is depressed. In this way, the contact force is carried locally through the stem 24d to the touchscreen 16 which in turn generates a position signal corresponding thereto.

By increasing the flexibility of the support wall 24c, the amount of applied force carried through the center stem 24d is increased for concentrating the force on the touchscreen 16 directly below the contacting stem 24d. By decreasing the flexibility, or increasing stiffness, of the support wall 24c, the applied load may be transferred to the support wall itself. However, the touchscreen 16 is nevertheless effective for inherently averaging the force applied thereto in any manner for effecting a position signal corresponding to the center of the applied force which corresponds with the center of the target 24a.

Since the touchscreen 16 illustrated in FIG. 4 is a resistive touchscreen actuated solely by contact force, the keys 24 may be suitably supported directly atop the touchscreen for pressing the touchscreen upon depression thereof with contact therebetween effecting the position signal corresponding to the depressed key. Each key 24 is therefore a contact key 24 by which the user may impart a contact actuation force on the touchscreen 16 while simultaneously providing tactile feedback through the individual key itself. In this way, the keypad 14 is a passive device requiring no external power, or internal electrical circuits, and simply provides an interface between the user and the touchscreen 16 which must be actuated firstly before actuating the touchscreen 16 in turn.

In the exemplary embodiment illustrated in FIGS. 3 and 4, the keypad 14 may be formed as a unitary member using a suitable elastic or resilient material such as silicone rubber which may be readily molded into shape. The silicone rubber allows each key 24 to assume a three dimensional configuration like a typical mechanical key which is readily visible and accessible by the user. The individual keys 24 are independent and distinct from each other each providing multiple visible targets for the user to depress, which is unlike the smooth, plain surface of the touchscreen 16 itself. The rubber key 24 has enhanced elasticity which allows it to be deformed during depression for actuating the touchscreen, and then returning to its original shape when the applied force is removed. The key may be directly depressed by the finger of a user, or by any other implement or stylus.

The keypad 14 may be attached to the touchscreen 16 in any suitable manner, which also allows it to be readily removed or repositioned as desired depending on the type and location of the desired virtual keypad 22. As shown in FIG. 4 for example, the touchscreen 16 and monitor 18 are suitably mounted in a corresponding frame 26 which may be metal or plastic as desired. A suitable bezel 28 encloses the front end of the monitor 18 surrounding the touchscreen 16, and is suitably attached to the frame 26.

A suitable retainer 30 is configured to surround the perimeter of the keypad 14 and secure it to a suitable portion of the bezel 28 atop a portion of the touchscreen 16. The retainer 30 may be formed of plastic, for example, and may snap fit into a corresponding socket formed in the bezel 28 for allowing it ready assembly and disassembly therefrom. In this way, no modifications to the main display monitor including the bezel 28 are required for mounting the keypad 14 in its various forms. This substantially reduces the required tooling costs for manufacturing the monitor and its specific bezel 28.

Since the keyscreen 12 may be configured with any type of touchscreen 16, the cooperating keypad 14 may take various forms as required for actuating the corresponding touchscreen. For the resistive touchscreen 16 illustrated in FIGS. 4 and 5, the keypad 14 may be a relative simple, unitary component having integral keys 24 therein. The keys 24 may take various forms for imparting contact force on local areas of the touchscreen 16 when depressed to correspond with the virtual keys 22a displayed on the monitor 18.

As shown in FIG. 2, the individual targets 24a or the entire keys 24 may be opaque with printed indicia thereon such as alphanumeric characters for example. Or, the targets 24a or entire keys 24 may be translucent or clear for transmitting light therethrough, and may be provided without any printed indicia thereon. In this way, the translucent targets may be used for viewing the virtual keypad 22 displayed on the monitor 18 behind the touchscreen 16. The display of the individual virtual keys 22a may be as simple as either a dark or light portion for highlighting individual keys 24 as desired. The virtual key 22a may be an alphanumeric character which is transmitted through the individual target for direct viewing by the user. Or, the virtual keys 22a may be complete words or other indicia for viewing by the user through the tactile keys 24. In this way, the individual keys 24 may be dynamically defined by the computer 20 in accordance with the virtual keypad 22 being displayed.

Another benefit of using the keyscreen 12 illustrated in FIG. 3, is the ability to provide the keypad 14 with dynamic, or changeable function keys as well as fixed function keys as desired. The touchscreen 16 may be sized for covering the entire monitor 18 as well as extending outwardly from an edge thereof as illustrated at the right side of the monitor 18. A row of the keys 24 may therefore be fixed-function keys having specific functions preassigned thereto, with a printed indicia thereon. These keys would not depend on the virtual keypad 22 since they would be outside the effective area of the monitor 18. However, they still may actuate the touchscreen and be assigned functions which may change as desired as programmed into the computer 20.

Since the individual keys 24 are 3-D contoured elements, they may be configured for providing inherent tactile feedback to the user by their construction and flexibility. They may therefore be configured for providing a snap action, or nonlinear movement positively indicating to the user that they have been depressed. The keys may also be configured to emit an audible click when depressed for providing an additional form of tactile feedback both heard and felt by the user. If desired, a speaker 32, as shown in FIG. 2, may be operatively joined to the computer 20 to emit an audible beep whenever one of the keys 24 is properly depressed.

Figure 6:
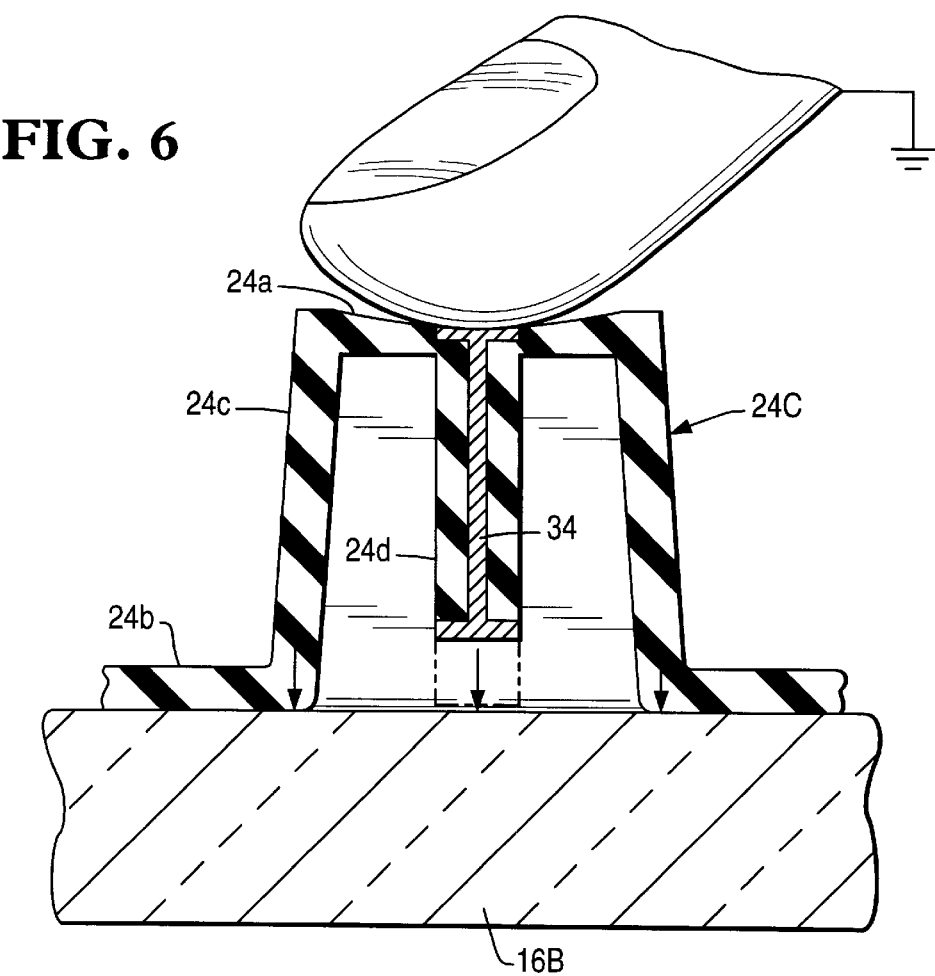
FIG. 6 is an elevational sectional view, like FIG. 4, of a keypad key in accordance with another embodiment of the present invention.

Illustrated in FIG. 6 is another form of the touchscreen which uses capacitance for effecting the position signal. The capacitive touchscreen is designated 16B and is also actuated by pressing electrical contact of the keys, designated 24C, thereatop. A capacitive touchscreen relies on the capacitance formed between the finger of a user and the touchscreen itself, which requires an electrically grounding circuit through the user.

In this embodiment, the individual keys 24C are preferably electrically conductive for providing an electrical path through the user to ground. In the exemplary embodiment illustrated in FIG. 6, the entire keypad including the web 24b may be an electrical insulator, such as being formed of silicone rubber. The individual keys 24C may therefore also include a suitable electrical conductor 34 integrally formed therein for providing an electrical grounding path from the touchscreen 16B to the respective targets 24a when the keys are depressed to contact the touchscreen.

The individual conductor 34 may include a pad at the distal end of the stem 24d with an electrical lead extending through the stem 24d to a corresponding tab mounted flush in the target 24a. When a finger contacts the upper pad of the conductor 34 to depress the key 24C and press the lower pad against the touchscreen 16B, an electrical grounding path is created through the key to the user and to an external ground. A capacitor is thereby effected which allows the touchscreen 16B to produce an output position signal corresponding with the location of the depressed key 24C.

Figure 7:
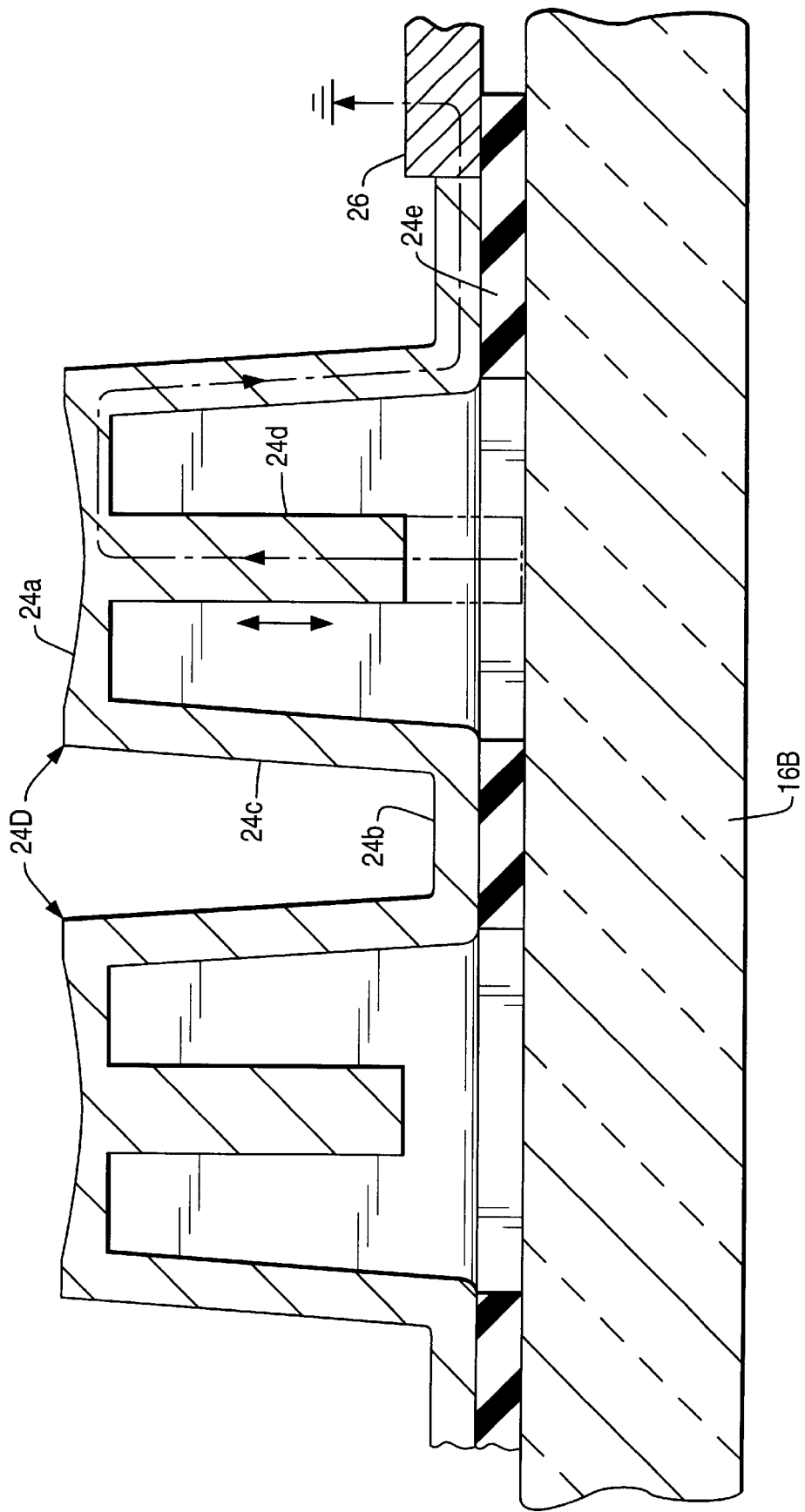
FIG. 7 is an elevational sectional view, like FIG. 4, of a pair of keypad keys in accordance with another embodiment of the present invention.

In yet another embodiment illustrated in FIG. 7, the keys, designated 24D, may have a different form for use with the capacitive touchscreen 16B. In this embodiment, the several keys 24D are interconnected or bussed together in a common electrical grounding path, and collectively joined to an external ground. This may be effected by forming the keys 24D and their interconnecting web 24b with a suitably electrically conductive material such as a thin flexible metal, or plastic with integral electrical lines therein, which are joined to a ground provided by a metal extension of the monitor frame 26.

The entire keypad may then be electrically insulated from the touchscreen 16B by providing an integral electrically insulating membrane 24e suitably joined thereto. When an individual key 24D is depressed, its center stem 24d contacts the touchscreen and creates an electrical grounding path through the keys and web to the monitor's ground. In this embodiment, a gloved finger or an insulated stylus may be used to depress an individual key and still allow the capacitive touchscreen to function.

Figure 8:
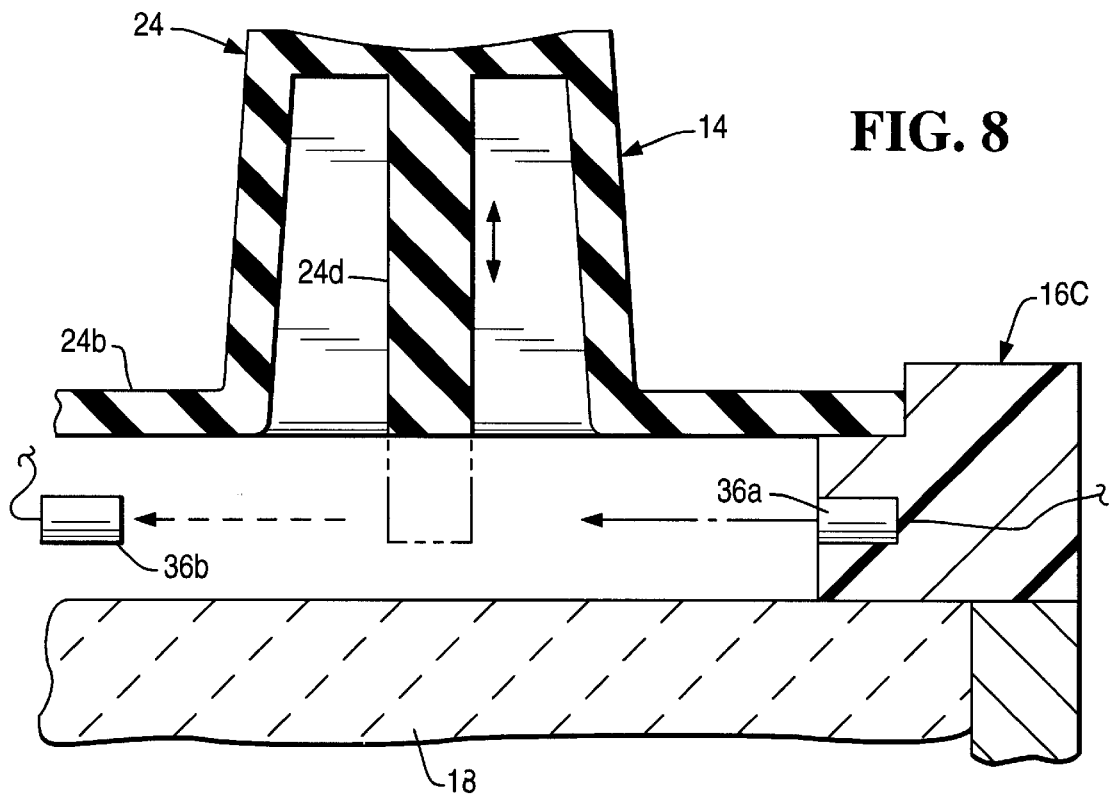
FIG. 8 is an elevational sectional view, like FIG. 4, of a keypad key in accordance with another embodiment of the present invention.

FIG. 8 illustrates yet another embodiment of the present invention wherein the touchscreen is in the form of an infrared (IR) touchscreen, designated 16C. IR touchscreens are conventional and include a plurality of infrared light emitters 36a and corresponding light detectors 36b arranged in a rectangular grid array for detecting location thereon. In a conventional IR touchscreen, a finger interrupts one or more of the light beams between the emitters and detectors which corresponds with a detected position on the touchscreen for which a corresponding position signal is generated.

Accordingly, the simple keypad 14 introduced in the first embodiment in FIGS. 14 may also be utilized in this embodiment but must be suitably mounted above the touchscreen 16C to prevent interruption of the light beams until required. The individual keys 24 are therefore spaced atop the touchscreen 16C, or above the display monitor 18, and are configured to interrupt the light path between a respective pair of the emitters and detectors upon depression thereof toward the touchscreen or monitor to effect the position signal. In this embodiment, the center stem 24d of each key 24 may be made slightly longer to initially correspond with the plane of the common web 24b. When the key 24 is depressed, the stem 24d is moved downwardly toward the monitor 18 to interrupt one or more of the light beams by which the position signal is generated.

Another type of touchscreen uses acoustic signals for detecting the presence of the users finger. The keypad of the present invention may also be suitably modified for this type of touchscreen to interrupt the acoustic signal using the individual keys 24, and providing tactile feedback as desired.

Figure 9:
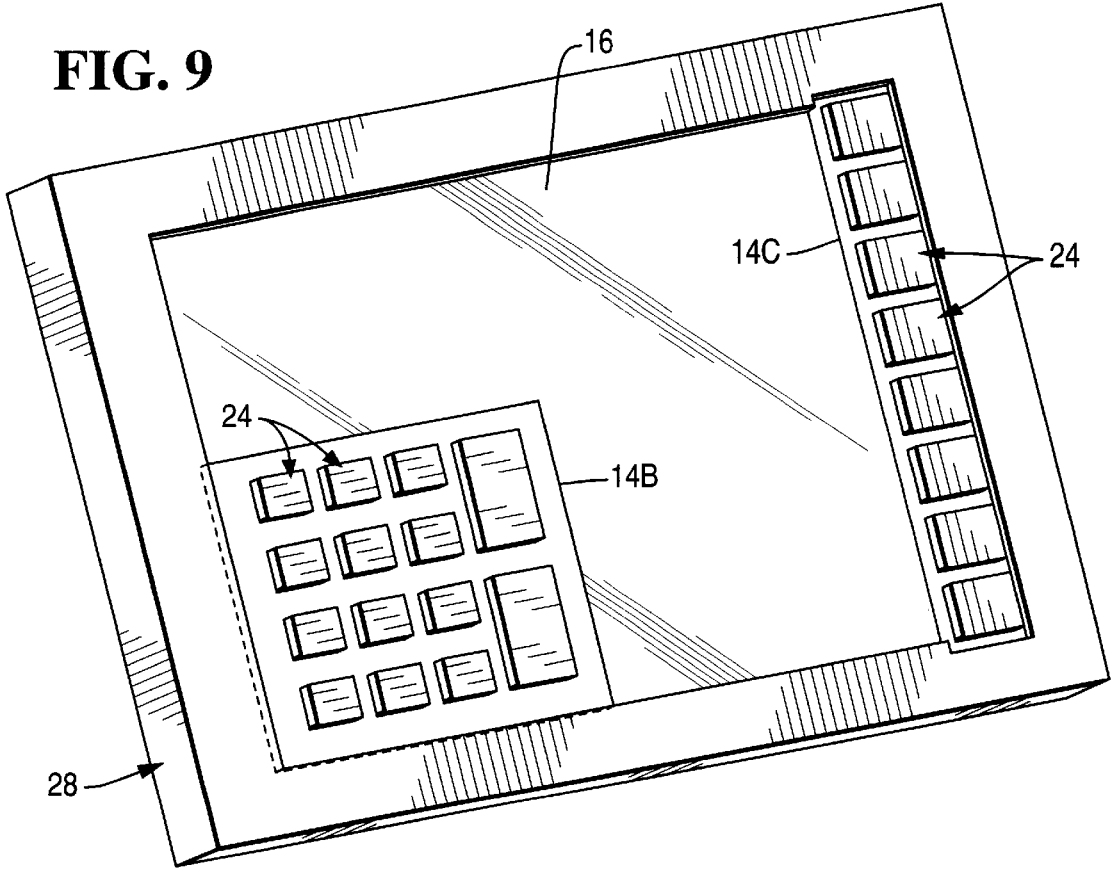
FIG. 9 is a perspective view of the display monitor illustrated in FIG. 1 having two different keypads cooperating with the common touchscreen thereof in accordance with additional embodiments of the present invention.

As indicated above, FIG. 1 illustrates an exemplary configuration of the keypad 14 which provides tactile feedback for various forms of the touchscreen. The keypad may take various configurations as required for specific applications. For example, FIG. 9 illustrates two additional forms of the keypad designated 14B and 14C which are removably attached to various locations of the bezel 28 atop the touchscreen 28. The second keypad 14B is configured for numeric data entry with relatively few keys which may be positioned over any one of the four corners of the touchscreen 16, or any intermediate position thereon as desired.

The third keypad 14C is configured as a vertical row of keys for being disposed on either the left or right side of the touchscreen 16 across the entire vertical extent thereof. The third keypad 14C may directly overlay a portion of the monitor therebelow, or may be located off the monitor while still atop the touchscreen 16. The third keypad 14C may have individual keys 24 which themselves may be rigid and formed of plastic mounted to a suitable frame, with internal springs which provide restoring force upon being depressed.

The various forms of the keypad 14 disclosed above are a relatively simple addition to touchscreens of various configurations for collectively defining an improved keyscreen 12 having tactile feedback not otherwise provided by touchscreens. The keypad 14 is interposed between the user and the touchscreen for providing the user with real, versus virtual, buttons which may be depressed as in conventional mechanical keyboards, which in turn actuate the touchscreen for entering data into the computer. The advantages of a mechanical keyboard are therefore combined with the advantages of conventional touchscreens in a simple combination thereof The individual keypads 14 may be made as simple as desired since they are passive and do not operate in the manner of powered mechanical keys which require cooperating switches for effecting corresponding electrical circuits defining which of several keys is being depressed. The individual keys 24 need only provide the function of tactile feedback to the user while simultaneously actuating the touchscreen in an improved manner.

In yet other embodiments (not shown), the keypad itself may be relatively flat, with discernible tactile keys formed therein. The keys may be thin membranes having flexibility for being displaced to actuate the touchscreens while providing tactile feedback to the user.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A KeyScreen comprising:
   a touchscreen for providing a position signal indicative of location thereon;
   a keypad disposed over said touchscreen, and having a plurality of hollow articulated keys to operatively engage said touchscreen upon depression thereof; and
   each of said keys includes a target resiliently supported around a perimeter thereof to a common web by a support wall integral therewith, and said support wall is resilient and elastic for being deformed during depression and returning to original shape after depression to provide snap action tactile feedback.

2. A keyscreen according to claim 1 wherein each of said keys includes an internal central stem extending from an underside of said target toward said touchscreen.

3. A keyscreen according to claim 1 wherein each of said keys is in the form of an empty inverted cup.

4. A keyscreen comprising:
   a touchscreen for providing a position signal indicative of location thereon;
   a keypad disposed over said touchscreen, and having a plurality of articulated keys to operatively engage said touchscreen upon depression thereof;
   wherein said keys include a barrier over said touchscreen for preventing direct actuation thereof, and said keys are resiliently supported over said touchscreen for being resiliently depressed toward said touchscreen for in turn actuating said touchscreen; and
   wherein each of said keys further includes a target defining at least a portion of said barrier resiliently supported by a web, with said target being depressible toward said touchscreen for actuation upon depression thereof to effect said position signal.

5. A method of using said keyscreen according to claim 4 for providing tactile feedback for data entry on said touchscreen comprising attaching said keypad over said touchscreen and depressing one of said keys to operatively engage said touchscreen.

6. A method according to claim 5 wherein said keys are resilient and elastic and said touchscreen is actuated by firstly depressing and deforming one of said keys which in turn actuates said touchscreen, and said deformed key returns to original shape after depression thereof to provide snap action tactile feedback.

7. A method according to claim 6, wherein each of said keys includes a central stem movable downwardly toward said touchscreen upon depression for interrupting an infrared light beam emitted by said touchscreen to detect location of said depressed key.

8. A method according to claim 6 wherein said keys are configured for imparting a contact force through said support walls on said touchscreen for actuation thereof.

9. A method according to claim 6 wherein said keys are electrically conductive for effecting an electrical circuit from said touchscreen and through said depressed key to an electrical ground.

10. A method according to claim 6 wherein said keys are configured for transmitting light therethrough from said touchscreen for viewing a corresponding virtual keypad displayed on a monitor disposed behind said touchscreen.

11. A method according to claim 6 wherein said keys are opaque.

12. A keyscreen according to claim 11 wherein each of said keys further includes a resilient support wall supporting said target atop said web, with said support wall being disposed atop said touchscreen for actuating said touchscreen upon depression of said target.

13. A keyscreen according to claim 11 wherein each of said keys further includes a central stem extending from said target toward said touchscreen for actuating said touchscreen upon depression of said target.

14. A keyscreen according to claim 11 wherein said keys are supported atop said touchscreen for pressing said touchscreen upon depression thereof to effect said position signal corresponding thereto.

15. A keyscreen according to claim 14 wherein said touchscreen is a resistive touchscreen being actuated solely by pressing contact by said keys thereatop.

16. A keyscreen according to claim 14 wherein said touchscreen is a capacitive touchscreen being actuated by pressing contact by said keys thereatop.

17. A keyscreen according to claim 16 wherein said web is an electrical insulator, and said keys provide an electrical grounding path from said touchscreen to said respective targets when depressed to contact said touchscreen.

18. A keyscreen according to claim 17 wherein said keys are interconnected in a common electrical grounding path, and joined to an external ground.

19. A keyscreen according to claim 11 wherein:
   said touchscreen is an infrared touchscreen including a plurality of light emitters and corresponding light detectors for detecting location thereon; and
   said keys are spaced atop said touchscreen, and are configured to interrupt a light path between a respective pair of said emitters and detectors upon depression thereof toward the touchscreen to effect said position signal.

20. A keyscreen according to claim 11 wherein said target is translucent.

21. A keyscreen according to claim 11 wherein said target is opaque.

22. A keyscreen according to claim 11 further comprising:
   a display monitor configured for defining a virtual keypad;
   said touchscreen being positioned atop said monitor; and
   said keypad being positioned atop said touchscreen in registry with said virtual keypad for permitting data entry with said keys corresponding to said virtual keypad.

* * * * *